(12) United States Patent
Smith (10) Patent No.: US 6,353,981 B1
(45) Date of Patent: Mar. 12, 2002

(54) MULTI-ENGAGEMENT SPRING FASTENER

(75) Inventor: Edward John Smith, Bonita Springs, FL (US)

(73) Assignee: Termax Corporation, Schaumburg, IL (US)

( * ) Notice: Subject to any disclaimer, the term of this patent is extended or adjusted under 35 U.S.C. 154(b) by 0 days.

(21) Appl. No.: 09/493,476

(22) Filed: Jan. 28, 2000

Related U.S. Application Data (60) Provisional application No. 60/121,392, filed on Feb. 25, 1999.

(51) Int. Cl.⁷ ............................................... A44B 21/00
(52) U.S. Cl. .............................. 24/295; 24/289; 24/293; 24/458
(58) Field of Search ........................... 24/292–297, 324, 24/453, 456, 459; 411/55, 60, 61, 182, 258, 542, 544; 280/751, 752; 296/39.1, 146.7, 189

(56) References Cited

U.S. PATENT DOCUMENTS

| | | | |
|---|---|---|---|
| 2,322,656 A | 6/1943 | Murphy | 24/73 |
| 2,329,688 A | 9/1943 | Bedford | 189/88 |
| 2,542,883 A | 2/1951 | Tinnerman | 24/259 |
| 2,607,971 A | 8/1952 | Bedford | 24/73 |
| 2,825,948 A | 3/1958 | Parkin | 24/73 |
| 3,525,129 A | 8/1970 | Holton | 24/73 |
| 3,673,643 A | 7/1972 | Kindell | 24/73 B |
| 3,864,789 A | 2/1975 | Leitner | 24/73 MF |
| 4,245,652 A | 1/1981 | Kelly et al. | 128/736 |
| 4,609,170 A | 9/1986 | Schnabl | 248/71 |
| 4,683,622 A | 8/1987 | Oehlke | 24/458 |
| 4,792,475 A | 12/1988 | Bien | 428/137 |
| 5,095,592 A | 3/1992 | Doerfling | 24/295 |
| 5,314,280 A | 5/1994 | Gagliardi | 411/182 |
| 5,373,611 A | 12/1994 | Murata | 24/297 |
| 5,422,789 A | 6/1995 | Fisher et al. | 361/719 |
| 5,542,158 A | 8/1996 | Gronau et al. | 24/295 |
| 5,887,319 A | 3/1999 | Smith | 24/293 |
| 6,101,686 A | * 8/2000 | Velthoven et al. | 24/295 |

FOREIGN PATENT DOCUMENTS

CA        496700        10/1953

OTHER PUBLICATIONS

The item shown in Attachment 1 was being sold more than one year before the provisional application 60/121,392 was filed (Feb. 25, 1999). The present application claims priorty of the provisional application 60/121,392.

* cited by examiner

*Primary Examiner*—Anthony Knight
*Assistant Examiner*—Ruth C. Rodriguez
(74) *Attorney, Agent, or Firm*—E. Vassiliou (57) ABSTRACT

This invention relates to a spring fastener, which comprises side structures, preferably connected to form a U-shaped structure. The two side structures have multiple engagement springs comprising pairs of recesses and respective peaks. The number of these pairs is different on one spring than the number of pairs on the other springs. The spring fastener may further comprise an elastic or resilient body under the top end of the fastener, thus providing noise elimination or dampening. In a different embodiment, the fastener may also comprise rigid supports over the two extremities of its top end, which rigid supports force the resilient body all the way around on the fastened article, so that this configuration provides, in addition to noise elimination or dampening, excellent waterproofing properties.

31 Claims, 5 Drawing Sheets

MULTI-ENGAGEMENT SPRING FASTENER

RELATED APPLICATIONS

This application claims priority of provisional patent application Ser. No. 60/121,392, filed on Feb. 25, 1999, which is incorporated herein by reference in its entirety.

FIELD OF THE INVENTION

This invention relates to spring fasteners, and more particularly to those fasteners characterized by a structure suitable to be engaged in a slot.

BACKGROUND OF THE INVENTION

A number of fasteners have been used in the past for securing one object on another object, as for example, securing an article such as for example a plastic sheet on a metal or other rigid plastic sheet. However, the fasteners being used presently are particularly designed for only a limited number of matching objects to be secured on each other. For sealing purposes, a secondary resilient sheet, or a resilient body attached to the fastener may be used.

Examples of conventional fasteners are disclosed in U.S. Pat. No. 5,542,158 (Gronau et al.); U.S. Pat. No. 5,422,789 (Fisher et al.), U.S. Pat. No. 5,373,611 (Murata); U.S. Pat. No. 4,609,170 (Schnabl); U.S. Pat. No. 3,864,789 (Leitner); U.S. Pat. No. 3,673,643 (Kindell); U.S. Pat. No. 2,825,948 (Parkin); U.S. Pat. No. 2,607,971 (Bedford, Jr.); U.S. Pat. No. 2,329,688 (Bedford, Jr.); U.S. Pat. No. 2,322,656 (Murphy), among others.

My U.S. Pat. Nos. 5,887,319 and 5,987,714, issued on Mar. 30, 1999, and on Nov. 23, 1999, respectively, describe self adjusting spring fasteners, and they are both incorporated herein by reference. These fasteners may be used by themselves, or with a resilient or elastic body attached to the fastener.

Elastic bodies which are suitable for the purposes of the instant invention are disclosed in U.S. Pat. No. 5,725,343 (Smith), and in the provisional application of Kanubhai Manibhai Patel, Michael Walter Smith and Edward John Smith, titled "High Performance Sealing Fastener", filed on Dec. 10, 1999, and which provisional application is incorporated herein by reference.

SUMMARY OF THE INVENTION

As aforementioned, this invention relates to spring fasteners characterized by a structure suitable to be engaged in a slot. More particularly, the invention pertains a spring fastener comprising a first side structure and a second side structure opposite the first side structure, the first side structure comprising a first wavelike multiple engagement spring having a first integral number of pairs of recesses and respective peaks, the second side structure comprising a second wave-like multiple engagement spring having a second integral number of pairs of recesses and respective peaks, the first integral number being different than the second integral number.

It is critical that both the first and the second engagement springs have a free upper end and an attached lower end, especially for easy installation, as well as space economy in the operation of the fastener.

Preferably, the first side structure and the second side structure are integrally connected to form a U-shaped configuration having a bottom and a top end, the top end having a top end length and two opposite extremities.

More preferably, the first wave-like multiple engagement spring has only one pair of a first recess and a respective first peak, while the second wave-like multiple engagement spring has only two pairs of recesses and respective peaks corresponding to a lower second peak, a lower second recess, an upper second peak and an upper second recess.

For increasing the operational flexibility of the spring fastener of the present invention, it is critical that the first peak is at a longer distance away from the bottom of the U-shaped configuration than the lower second peak, and wherein the first recess is at a longer distance away from the bottom of the U-shaped configuration than the upper second peak. For the same reason it is further important that the first recess is at a shorter distance away from the bottom of the U-shaped configuration than the upper second recess, and wherein the first peak and the second lower recess are substantially equidistant from the bottom of said U-shaped configuration.

In a different embodiment of this invention, the spring fastener comprises a first side structure and a second side structure opposite the first side structure, the first side structure comprising a first spring having a bent, the second side structure comprising a second spring, the second spring being a wave-like multiple engagement spring having recesses and peaks.

In the case of this embodiment also, it is preferable that the first side structure and the second side structure are integrally connected to form a U-shaped configuration having a bottom and a top end, the top end having a top end length and two opposite extremities. It is further critical that the bent is at a longer distance away from the bottom of the U-shaped configuration than the lower second peak.

In order to avoid irreversible insertion of the fastener into a respective slot, it is critical that the first spring also comprises a protective recess above the bent.

This invention also encompasses fasteners which comprise rigid supports over the two extremities of the top end, which rigid supports are especially useful in the case that the spring fastener further comprises a molded elastic body disposed under the top end, extending under the two extremities of the top end, and having a body length. In the absence of the rigid supports, it is important that the body length is at least 1.75 times the top end length.

In the case that the rigid extremities are present, the molded elastic body should be disposed under both the top end and both extremities of the top end, since the purpose of the rigid supports is to hold the elastic body in place.

This invention also relates to a vehicle comprising any of the fasteners in any of the variations described above.

DESCRIPTION OF THE DRAWING

The reader's understanding of practical implementation of preferred embodiments of the invention will be enhanced by reference to the following detailed description taken in conjunction with perusal of the drawing figures, wherein.

DETAILED DESCRIPTION OF THE INVENTION

As aforementioned, this invention relates to spring fasteners characterized by a structure suitable to be engaged in a slot and secure one article on another article. A class of embodiments of this invention are directed to provide noise elimination or dampening, which noise may be produced by frictional movement of the two article with respect to the fastener engagement. A different class of embodiments are directed to provide waterproofing in addition to noise elimination or dampening.

Figures 1, 2, 3:
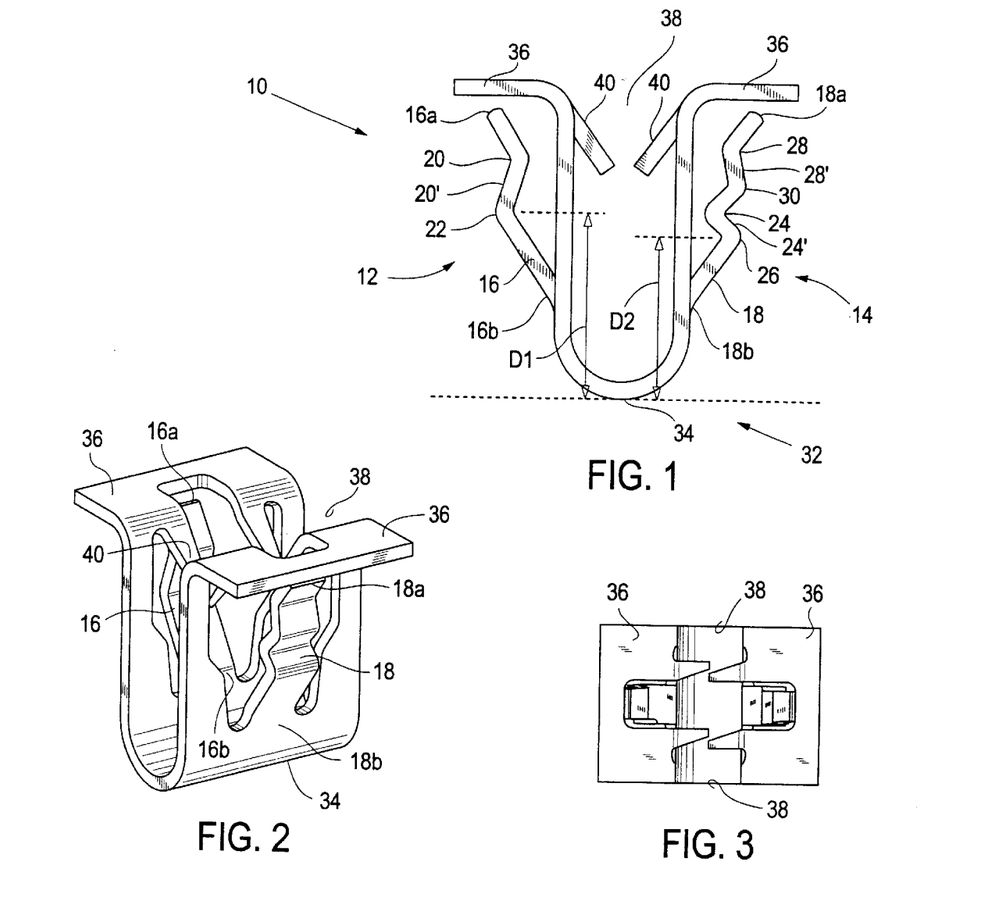
FIG. 1 illustrates a side view of a multi-point engagement fastener according to a preferred embodiment of the present invention.
FIG. 2 shows a perspective view of the spring fastener of FIG. 1.
FIG. 3 shows the top view of a fastener according to another preferred embodiment of the present invention, which comprises restricting barbs. These barbs are useful in restricting an engaged article part from freely sliding sideways, and even be disengaged from the fastener.

Referring now to FIGS. 1 and 2, there is depicted a spring fastener 10, comprising a first side structure 12 (shown on the left side of FIGS. 1 and 2) and a second side structure 14 (shown on the right side of FIGS. 1 and 2). The first side structure 12 comprises a first wave-like multiple engagement spring 16, and the second side structure 14 comprises a second wave-like multiple engagement spring 18.

The first wave-like multiple engagement spring 16 has one pair of a first recess 20 and a respective first peak 22, as well as an upper free end 16a, and an attached lower end 16b. The second wave-like multiple engagement spring 18 has two pairs of recesses and respective peaks; namely, a pair of a lower second recess 24 with a respective lower second peak 26, and a pair of an upper second recess 28 with a respective upper second peak 30. The second wave-like multiple engagement spring 18 also has an upper free end 18a, and an attached lower end 18b.

In general, according to this invention, the first wave-like multiple engagement spring 16 must have a first integral number of pairs of recesses and respective peaks, and the second wave-like multiple engagement spring 18 must have a second integral number of pairs of recesses and respective peaks, the first integral number being different than the second integral number.

According to this embodiment of the present invention, the first side structure 12 and the second side structure 14 are integrally connected to form a U-shaped configuration 32 having a bottom 34 and a top end 36. The top end 36 has two opposite extremities 38. Under the top end 36, and within the U-shaped configuration there are disposed securing barbs 40, which secure an article part, which is inserted into the U-shaped configuration through the top end 36. The barbs 40 have such inclination and resiliency that it is considerably easier to insert the article part into the U-shaped configuration, than it is to remove it.

Figure 4:
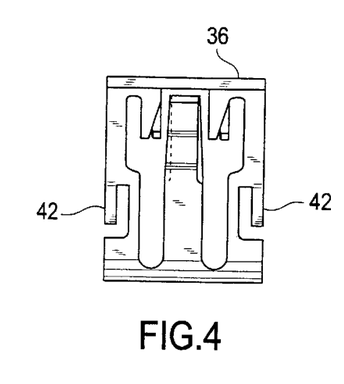
FIG. 4 shows the front view of the fastener of FIG. 3.
Figure 5:
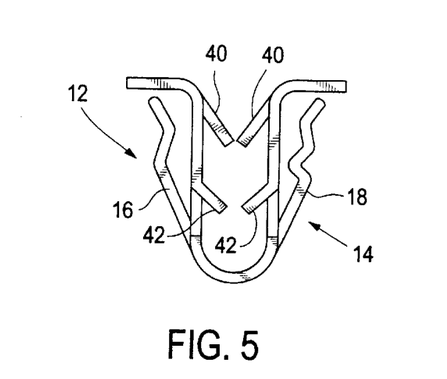
FIG. 5 shows the side view of the fastener of FIG. 3.

The fastener may also comprise restricting barbs, better shown 42. Better shown in 3–5, which are useful in restricting the article part from freely sliding sideways, and even be disengaged from the fastener.

According to the same embodiment, the first peak 22 is at a longer distance D1 away from the bottom 34 of the U-shaped configuration 32, than the lower second peak 26, which is at a distance D2 away from the bottom 32 of the U-shaped configuration 32. Similarly, the first recess 20 is at a longer distance away from the bottom 34 of the U-shaped configuration 32 than the upper second peak 30.

Figure 6:
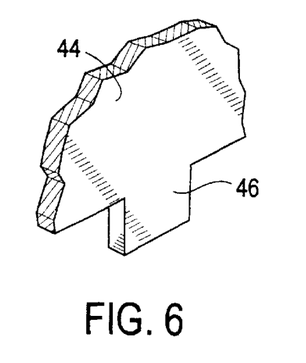
FIG. 6 shows a first article having a pillar.
Figure 7:
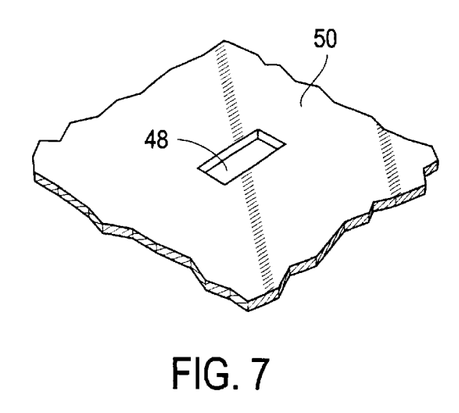
FIG. 7 shows a second article having a slot.

In operation of this embodiment, a first article 44 having a pillar 46, better shown in FIG. 6, is secured on the fastener 10 (FIGS. 1, 2) by inserting the pillar 46 into the U-shaped configuration of the fastener 10 through its top end 36. In the Automotive Industry, the article 44 is usually a plastic structure. The fastener is then inserted to a slot 48 of a second article 50. In the Automotive Industry, the second article 50 is usually a metal structure. Of course, the sequence may be the opposite; that is to insert first the fastener 10 into the slot 48, and then secure the first article 44 to the fastener 10 by inserting the pillar 46 into the U-shaped structure through its top end 38.

Depending on how far the fastener 10 is inserted into the slot, there are three locking positions on the springs 16 and 18 of the fastener 10, which can lock the fastener in place. These positions are a first engagement position 24' between the lower second peak 26 and the recess 24, a second engagement position 20' between the first peak 22 and the first recess 20, and a third engagement position 28' between the upper second peak 30 and the second upper recess 28. This attribute is very important for a number of reasons, among which is the fact that the thickness of the second article can vary within considerably wider limits, the curvature of the second article can vary within considerably wider limits, other articles (for example sheets, flexible or resilient, etc.) may be placed on top of the second article, if the fastener is engaged in the third engagement position, and it is pulled out of engagement, it will automatically engage on the second engagement position, and if it is still pulled out of the second engagement position, it will automatically engage on the first engagement position, which is not true for conventional fasteners having just one engagement position.

One or both of the first and second articles may be freed from the fastener by pulling them away from the fastener with a suitable force, which is higher than the force used to secure or engage each article on the fastener.

Figure 8:
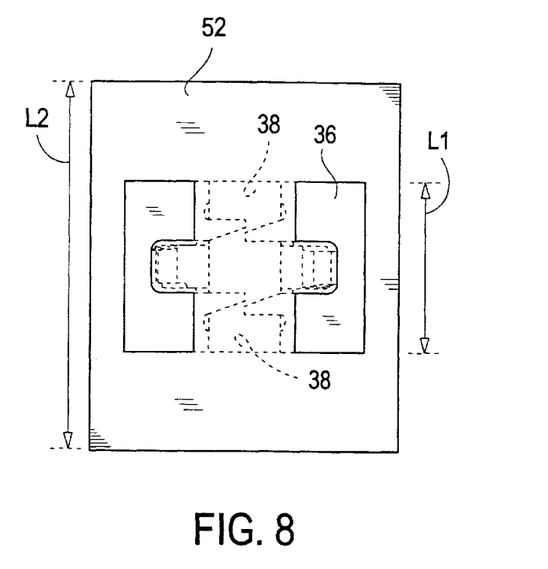
FIG. 8 shows the top view of a fastener according to another preferred embodiment of the present invention, wherein an elastic body is disposed under the top end and the extremities of the top end of the fastener.
Figure 9:
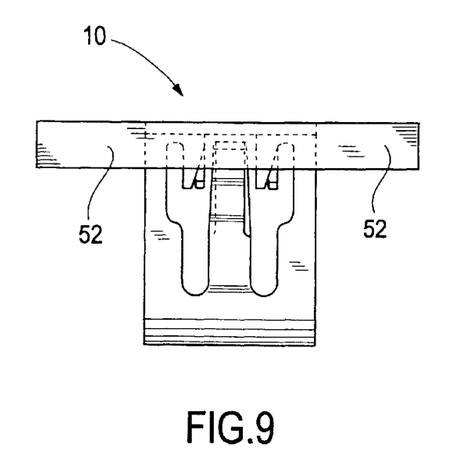
FIG. 9 shows the front view of the fastener of FIG. 8.
Figure 10:
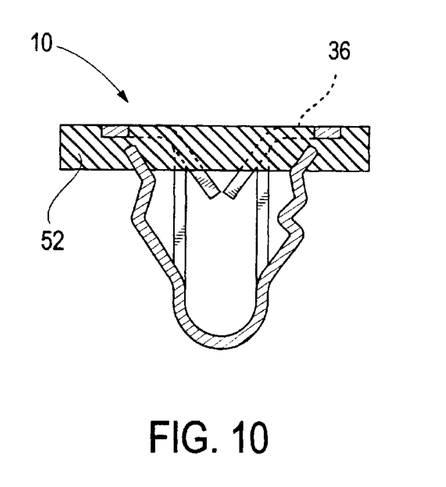
FIG. 10 shows the side view of the fastener of FIG. 8.

In another embodiment of this invention, better shown in FIGS. 8–10, there is depicted another preferred embodiment of the present invention, wherein an elastic body or a resilient body 52 is disposed under the top end 36, and it extends to the extremities 38 of the top end 36. The elastic or resilient body 52 is preferably molded on the fastener 10, and it preferably comprises a thermoplastic elastomer. In less preferred embodiments, it may comprise a silicone or plastisol or polyurethane, preferably in a foamed configuration. The elastic or resilient body 52 is functional in eliminating or dampening noises produced by the engagement of articles through the fastener. For maximizing noise dampening, it is critical that the length L2 of the elastic body 52 is at least 1.75 times the length L1 of the top end 36.

The operation of this embodiment is substantially the same as in the previous embodiment, with the difference that the elastic body 52 is at least partially squeezed on top of the second article 50 (FIG. 7), thus eliminating or dampening any noises, such frictional noises, etc. It may also give limited waterproofing.

Figures 11, 12, 13, 14:
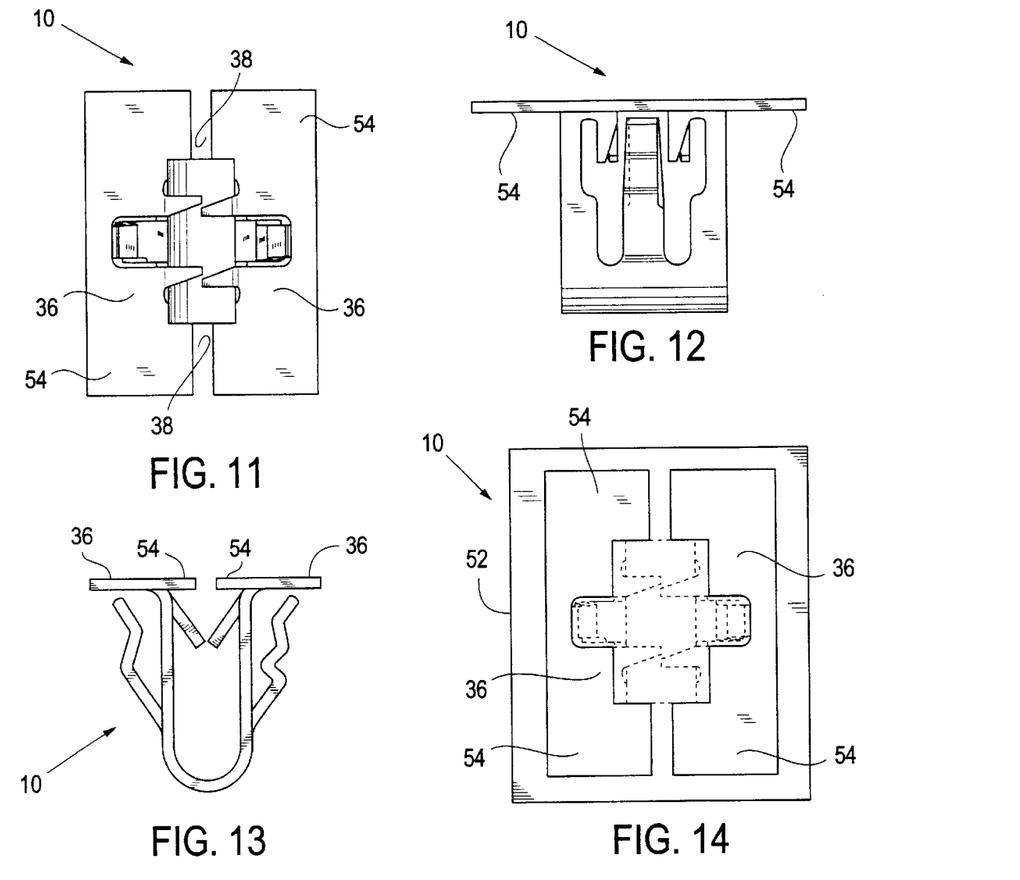
FIG. 11 shows the top view of a fastener according to another preferred embodiment of the present invention, wherein the fastener further comprises rigid supports at the extremities of the top end.
FIG. 12 shows the front view of the fastener of FIG. 11.
FIG. 13 shows the side view of the fastener of FIG. 11.
FIG. 14 shows the top view of a fastener according to still another preferred embodiment of the present invention, wherein an elastic body is disposed under the top end and the rigid supports of the fastener.

In another preferred embodiment of the present invention, better shown in FIGS. 11–13, the fastener 10 further comprises rigid supports 54, which extend within the extremities 38 of the top end 36 of the fastener 10. The rigid supports 54 are preferably integral parts of the fastener 10. In other words, they are preferably monolithically extended from the fastener.

Figure 15:
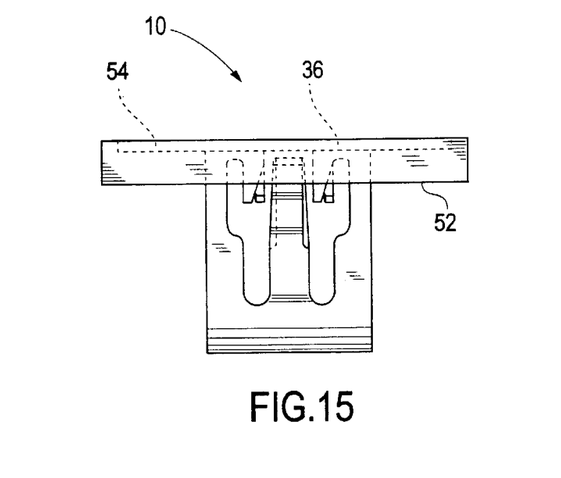
FIG. 15 shows the front view of the fastener of FIG. 14.
Figure 16:
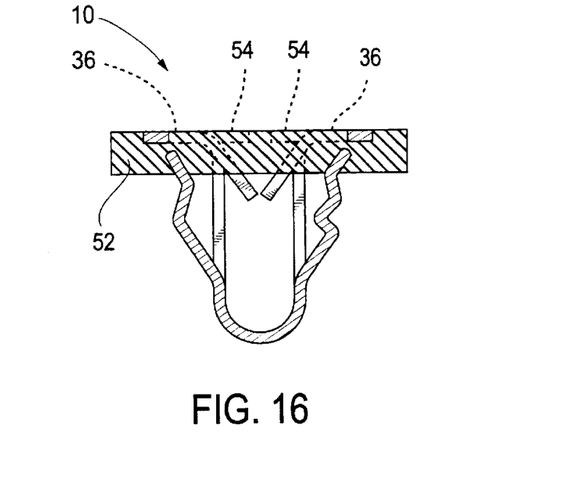
FIG. 16 shows the side view of the fastener of FIG. 14.

The operation of this embodiment of the instant invention is illustrated in FIGS. 14–16, wherein the elastic or resilient body 52 is disposed, preferably by molding, under the top end 36, and the rigid supports 54. When the fastener shown in FIGS. 14–16 is inserted, preferably snugly, in the slot 48 (FIG. 7), the elastic or resilient body 52 is totally pushed and squeezed, all the way around, over the second article 50 (FIG. 7), thus providing not only elimination or dampening of any noises, such frictional noises, etc., but also excellent waterproofing properties.

Figure 17:
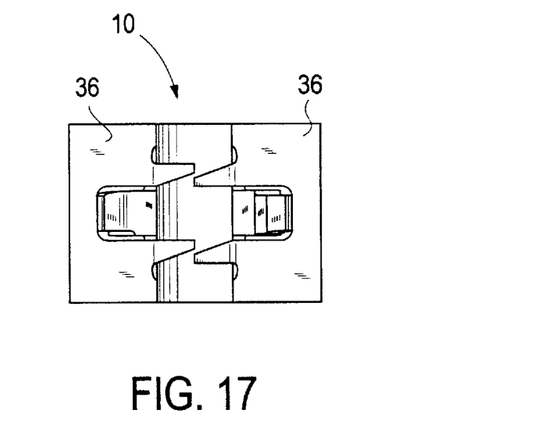
FIG. 17 shows the top view of a fastener according to still another preferred embodiment of the present invention, wherein the first spring has a bent.
Figure 18:
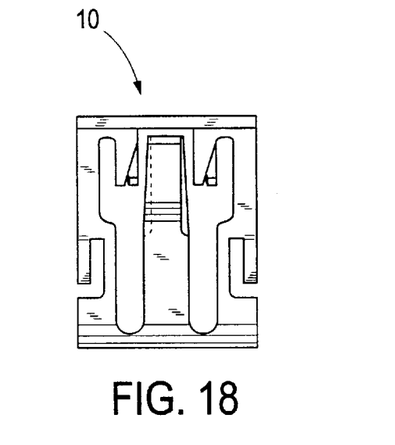
FIG. 18 shows the front view of the fastener of FIG. 17.
Figure 19:
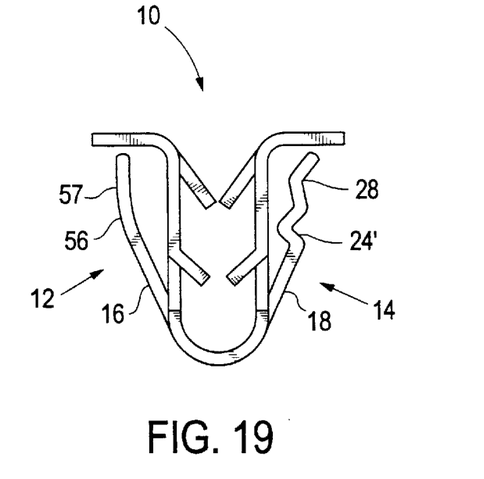
FIG. 19 shows the side view of the fastener of FIG. 17.
Figure 19A:
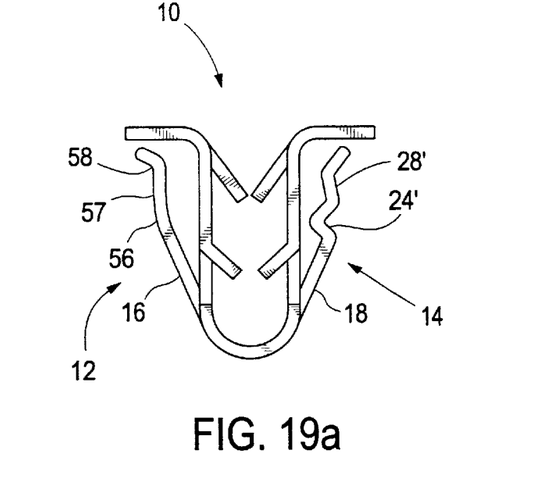
FIG. 19a shows the side view of a similar fastener as the one shown in FIG. 19, the first spring of which further comprises a protective recess above the bent.

In another preferred embodiment of this invention, better shown in FIGS. 17–19, the first spring 16 has a bent 56 in place of the configuration described in the previous embodiments. The fastener may also comprise a protective recess 58 (FIG. 19a). The rest of the elements are the same as the ones shown and described earlier and in FIGS. 1–5.

The operation of this embodiment is substantially the same as in the previous embodiments. When the fastener 10 is inserted into the slot 48 (FIG. 7), there are three engagement positions on which the fastener 10 may be secured; namely 24', 57 and 28' as the first and second spring are pushed toward each other by the slot. The protective recess 58, above the bent 56, is to prevent the fastener from being inserted into the slot irreversibly.

In other embodiments of this invention, the fastener shown in FIGS. 17–19a, may also comprise rigid supports (not shown) and/or en elastic body as described in the previous embodiments.

The operation of these embodiments is substantially the same as described for the previous embodiments.

Regardless of the exact configuration of the first and second spring of the fastener, an elastic body molded to the fastener, and having the attributes already discussed, may be used to provide noise dampening or elimination. Thus, the present invention also encompasses any type of spring fastener, as better shown for example in FIGS. 20–22, which spring fastener comprises a first side structure 12 and a second side structure 14 opposite the first side structure, the first side structure comprising a first engagement spring 16, the second side structure comprising a second engagement spring 18, the first side structure 12 and the second side structure 14 being integrally connected to form a U-shaped configuration having a bottom 34 and a top end 36, the top end having a top end length L1 and two opposite extremities 38, the fastener further comprising an elastic body 52 under the top end 36 and the extremities of the top end 38, the elastic body having a body length L2, which body length is at least 1.75 times the top end length L1.

Figure 20:
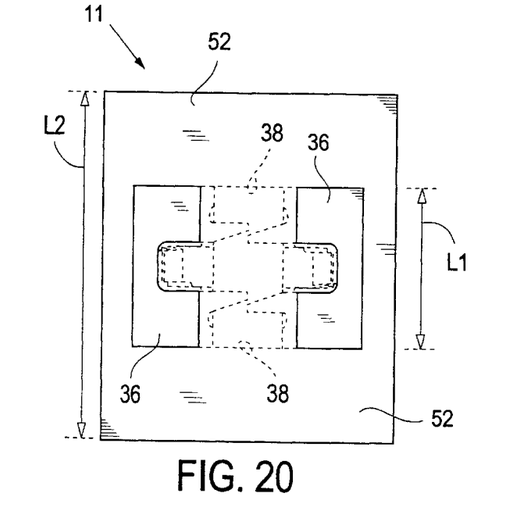
FIG. 20 shows the top view of a fastener according to still another preferred embodiment of the present invention, wherein, regardless of spring configuration, the fastener further comprises a molded elastic body under the top end, the elastic body having a body length, which body length is at least 1.75 times the top end length.
Figure 21:
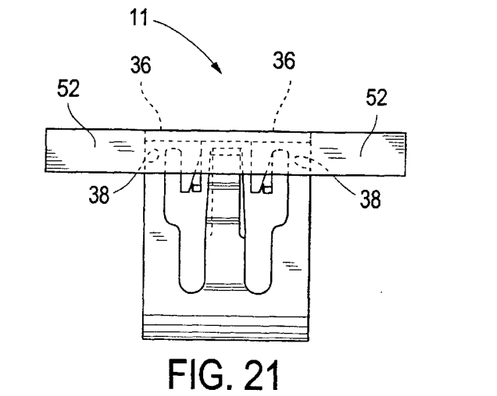
FIG. 21 shows the front view of the fastener of FIG. 20.
Figure 22:
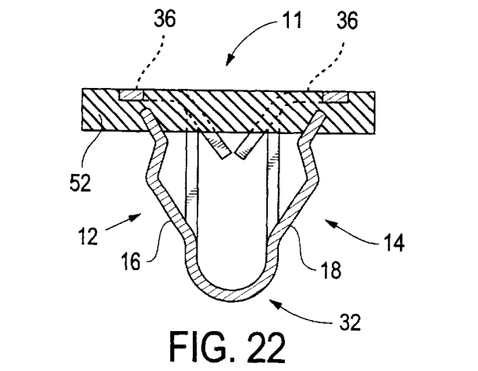
FIG. 22 shows the side view of the fastener of FIG. 20.

The elastic or resilient body 52 is preferably molded on the fastener 11, and it preferably comprises a thermoplastic elastomer. In less preferred embodiments, it may comprise a silicone or plastisol or polyurethane, preferably in a foamed configuration.. The elastic or resilient body 52 is functional in eliminating or dampening noises produced by the engagement of articles through the fastener. For maximizing noise dampening, it is critical that the length L2 of the elastic body 52 is at least 1.75 times the length L1 of the top end 36.

The operation of this embodiment is substantially the same as in the previous embodiments comprising elastic or resilient bodies. The elastic body 52 is at least partially squeezed on top of the second article 50 (FIG. 7), thus eliminating or dampening any noises, such frictional noises, etc. It may also give limited waterproofing.

Figure 23:
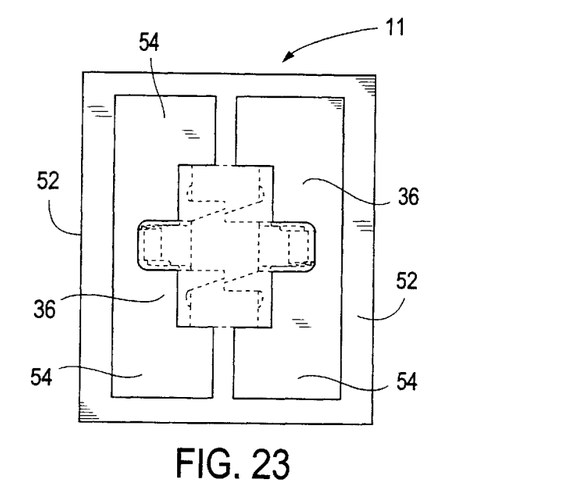
FIG. 23 shows the top view of a fastener according to still another preferred embodiment of the present invention, wherein, regardless of spring configuration, an elastic body is disposed under the top end and the rigid supports of the fastener.
Figure 24:
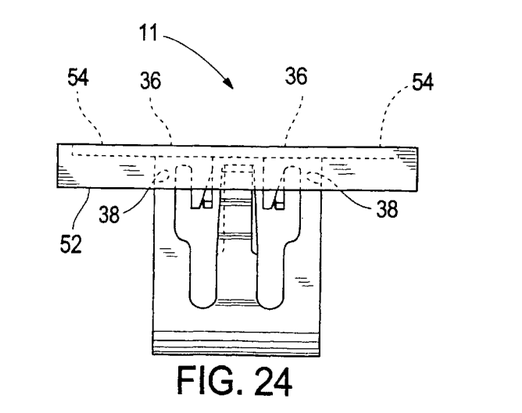
FIG. 24 shows the front view of the fastener of FIG. 23.
Figure 25:
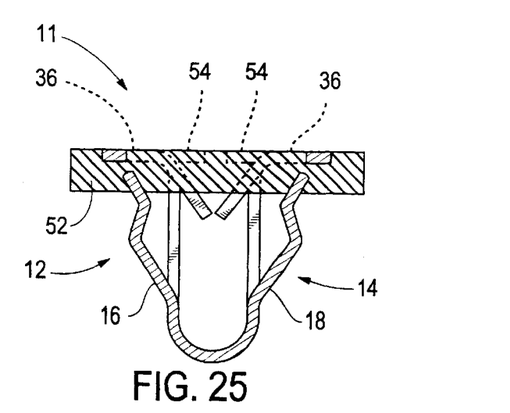
FIG. 25 shows the side view of the fastener of FIG. 23.

Further, the present invention also encompasses any type of spring fastener, similar to the fastener shown in FIGS. 11–13, but differing in that it may have engagement springs of any configuration, such as for example the configuration of the engagement springs 16 and 18 of the fastener shown in FIGS. 23–25, which spring fastener comprises a first side structure 12 and a second side structure 14 opposite the first side structure, the first side structure comprising a first engagement spring 16, the second side structure comprising a second engagement spring 18, the first side structure 12 and the second side structure 14 being integrally connected to form a U-shaped configuration having a bottom 34 and a top end 36, the top end having a top end having two opposite extremities 38, the fastener further comprising rigid supports 54 over the two extremities 38 of the top end 36. The rigid supports 54 are preferably integral parts of the fastener 11. In other words, they are preferably monolithically extended from the fastener.

The fastener shown if FIGS. 23–25, may further comprise an elastic body 52 under the top end 36 and the extremities 38 of the top end 36, and it preferably comprises a thermoplastic elastomer. In less preferred embodiments, it may comprise a silicone or plastisol or polyurethane, preferably in a foamed configuration.

In operation, when the fastener shown in FIGS. 23–25 is inserted, preferably snugly, in the slot 48 (FIG. 7), the elastic or resilient body 52 is totally pushed and squeezed, all the way around, over the second article 50 (FIG. 7), thus providing not only elimination or dampening of any noises, such frictional noises, etc., but also excellent waterproofing properties.

It should be stressed that the attributes of the rigid supports 54, and the elastic body 52 apply in all occasions, regardless of the particular configuration of the engagement springs 16 and 18.

Automobiles or other vehicles may be made, comprising one or more of the fasteners of the instant invention, providing substantial improvements regarding safety, performance and comfort.

Examples of embodiments demonstrating the operation of the instant invention, have now been given for illustration purposes only, and should not be construed as restricting the scope or limits of this invention in any way.

What is claimed is:

1. A spring fastener comprising a first side structure and a second side structure opposite the first side structure, the first side structure comprising a first wave-shaped multiple engagement spring having a first integral number of pairs of recesses and respective peaks, the second side structure comprising a second wave-shaped multiple engagement spring having a second integral number of pairs of recesses and respective peaks, the first integral number being different than the second integral number, wherein the first side structure and the second side structure are integrally connected to form a U-shaped configuration having a bottom end and a top end, the top end having a top end length and two opposite extremities, both the first spring and the second spring being partially cut from a respective side structure in a manner to extend away from the U-shaped configuration, and both the first spring and the second spring having a free high end disposed under the top end of the U-shaped configuration, and a low end connected to a respective side structure in the vicinity of the bottom end of the U-shaped configuration.

2. A spring fastener as defined in claim 1, further comprising a molded elastic body under the top end, the elastic body having a body length, which body length is at least 1.75 times the top end length.

3. A spring fastener as defined in claim 1, further comprising rigid supports over the two extremities of the top end.

4. A spring fastener as defined in claim 3, further comprising a molded elastic body disposed under the top end and both extremities of the top end.

5. A spring fastener as defined in claim 1, wherein the first wave-shaped multiple engagement spring has only one pair of a first recess and a respective first peak, while the second wave-shaped multiple engagement spring has only two pairs of recesses and respective peaks corresponding to a lower second peak, a lower second recess, an upper second peak and an upper second recess.

6. A spring fastener as defined in claim 5, further comprising a molded elastic body under the top end, the elastic body having a body length, which body length is at least 1.75 times the top end length.

7. A spring fastener as defined in claim 5, further comprising rigid supports over the two extremities of the top end.

8. A spring fastener as defined in claim 7, further comprising a molded elastic body disposed under the top end and both extremities of the top end.

9. A spring fastener as defined in claim 5, wherein the first peak is at a longer distance away from the bottom of the U-shaped configuration than the lower second peak, and wherein the first recess is at a longer distance away from the bottom of the U-shaped configuration than the upper second peak.

10. A spring fastener as defined in claim 9, further comprising a molded elastic body under the top end, the elastic body having a body length, which body length is at least 1.75 times the top end length.

11. A spring fastener as defined in claim 9, further comprising rigid supports over the two extremities of the top end.

12. A spring fastener as defined in claim 11, further comprising a molded elastic body disposed under the top end and both extremities of the top end.

13. A spring fastener comprising a first side structure and a second side structure opposite the first side structure, the first side structure and the second side structure being integrally connected to form a U-shaped configuration having a bottom and a top end, the top end having a top end length and two opposite extremities, the first side structure comprising a first wave-shaped multiple engagement spring having one pair of recess and respective peak, the second side structure comprising a second wave-shaped multiple engagement spring having two pairs of recesses and respective peaks, corresponding to a lower second peak, a lower second recess, an upper second peak and an upper second recess, wherein the first recess is at a shorter distance away from the bottom of the U-shaped configuration than the upper second recess, and wherein the first peak and the second lower recess are substantially equidistant from the bottom of said U-shaped configuration.

14. A spring fastener as defined in claim 13 further comprising a molded elastic body under the top end, the elastic body having a body length, which body length is at least 1.75 times the top end length.

15. A spring fastener as defined in claim 13, further comprising rigid supports over the two extremities of the top end.

16. A spring fastener as defined in claim 15, further comprising a molded elastic body disposed under the top end and both extremities of the top end.

17. A spring fastener as defined in claim 13, wherein the first peak is at a longer distance away from the bottom of the U-shaped configuration than the lower second peak, and wherein the first recess is at a longer distance away from the bottom of the U-shaped configuration than the upper second peak.

18. A spring fastener as defined in claim 17, further comprising a molded elastic body under the top end, the elastic body having a body length, which body length is at least 1.75 times the top end length.

19. A spring fastener as defined in claim 17, further comprising rigid supports over the two extremities of the top end.

20. A spring fastener as defined in claim 19, further comprising a molded elastic body disposed under the top end and both extremities of the top end.

21. A vehicle comprising two articles connected with a spring fastener, the spring fastener comprising a first side structure and a second side structure opposite the first side structure, the first side structure comprising a first wave-shaped multiple engagement spring having a first integral number of pairs of recesses and respective peaks, the second side structure comprising a second wave-shaped multiple engagement spring having a second integral number of pairs of recesses and respective peaks, the first integral number being different than the second integral number, wherein the first side structure and the second side structure are integrally connected to form a U-shaped configuration having a bottom end and a top end, the top end having a top end length and two opposite extremities, both the first spring and the second spring being partially cut from a respective side structure in a manner to extend away from the U-shaped configuration, and both the first spring and the second spring having a free high end disposed under the top end of the U-shaped configuration, and a low end connected to a respective side structure in the vicinity of the bottom end of the U-shaped configuration.

22. A vehicle as defined in claim 21, wherein the first wave-shaped engagement spring has only one pair of a first recess and a respective first peak, while the second wave-shaped multiple engagement spring has only two pairs of recesses and respective peaks corresponding to a lower second peak, a lower second recess, an upper second peak and an upper second recess.

23. A vehicle as defined in claim 22, wherein
the first side structure and the second side structure are integrally connected to form a U-shaped configuration having a bottom and a top end, the top end having a top length and two opposite extremities;
the first peak is at a longer distance away from the bottom of the U-shaped configuration than the lower second peak; and
the first recess is at a longer distance away from the bottom of the U-shaped configuration than the upper second peak.

24. A vehicle as defined in claim 23, wherein the spring fastener further comprises a molded elastic body under the top end, the elastic body having a body length, which body length is at least 1.75 times the top end length.

25. A vehicle as defined in claim 23, wherein the spring fastener further comprises rigid supports over the two extremities of the top end.

26. A vehicle as defined in claim 25, wherein the spring fastener further comprises a molded elastic body disposed under the top end and both extremities of the top end.

27. A vehicle comprising two articles connected with a spring fastener, the spring fastener comprising a first side structure and a second side structure opposite the first side structure, the first side structure and the second side structure being integrally connected to form a U-shaped configuration having a bottom and a top end, the top end having a top end length and two opposite extremities, the first side structure comprising a first wave-shaped multiple engagement spring having one pair of recess and respective peak, the second side structure comprising a second wave-shaped multiple engagement spring having two pairs of recesses and respective peaks, corresponding to a lower second peak, a lower second recess, an upper second peak and an upper second recess, wherein the first recess is at a shorter distance away from the bottom of the U-shaped configuration than the upper second recess, and wherein the first peak and the second lower recess are substantially equidistant from the bottom of said U-shaped configuration.

28. A vehicle as defined in claim 27, wherein the spring fastener further comprises rigid supports over the two extremities of the top end.

29. A vehicle as defined in claim 28, wherein the spring fastener further comprises a molded elastic body disposed under the top end and both extremities of the top end.

30. A vehicle as defined in claim 27, wherein the spring fastener further comprises a molded elastic body under the top end.

31. A vehicle as defined in claim 30, wherein the elastic body has a body length, which body length is a least 1.75 times the top end length.

* * * * *